(No Model.)
J. ARNOTT, Jr.
CHECKING AND UNCHECKING DEVICE.
No. 534,593. Patented Feb. 19, 1895.
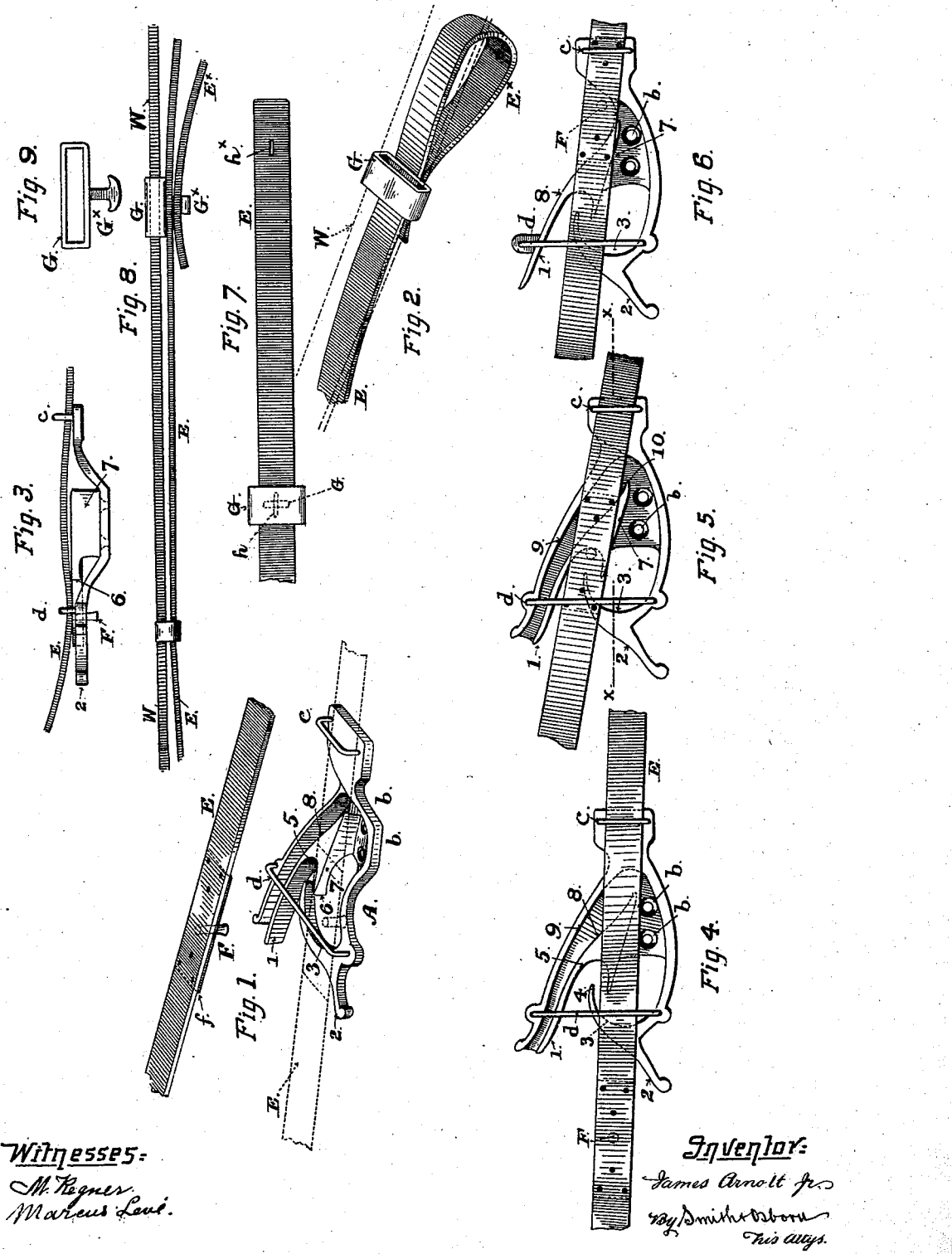
Witnesses:
M. Regner
Marcus Levi
Inventor:
James Arnott Jr.
by Smith & Osborn
his Attys.

United States Patent Office.

JAMES ARNOTT, JR., OF CAMPTONVILLE, ASSIGNOR OF ONE-HALF TO WILLIAM H. RODEN, OF SAN FRANCISCO, CALIFORNIA.

CHECKING AND UNCHECKING DEVICE.

SPECIFICATION forming part of Letters Patent No. 534,593, dated February 19, 1895.

Application filed November 11, 1893. Serial No. 490,673. (No model.)

*To all whom it may concern:*

Be it known that I, JAMES ARNOTT, Jr., a citizen of the United States, residing in Camptonville, in the county of Yuba and State of California, have invented certain new and useful Improvements in Checking and Unchecking Devices, of which the following is a specification.

This invention relates to improvements in that class of devices, or attachments to harness which enables the driver to hook and unhook the check-rein of a horse in harness without leaving the vehicle; and the improvements comprise a check-hook having certain novel points and features of construction, as hereinafter fully explained, and a checking and unchecking strap also of novel construction and arrangement in combination with the check-rein of the horse and the hook; by means of which the driver is enabled to hook, and also to release, the check-rein without leaving his seat. The hook is constructed to be secured on the harness-pad or saddle between the rein-terrets in the position occupied by the ordinary check-rein hook. It is designed to engage and hold the check-rein and also to disengage and release the check-rein in a more nearly automatic manner than the devices or attachments of the kind now in use, that is to say, both the checking and the unlocking operations are done by a simple pull of the checking-strap independently of any pull or strain on the part of the horse.

The nature of the said improvements and the manner in which I proceed to construct, apply and carry out the same are explained in the following description and the accompanying drawings that form a part of this specification.

Figure 1 is a perspective view of the two parts of the device, namely, the hook that is fixed to the harness, and the strap that is attached to the check rein. The strap is shown detached from the hook and directly over the position it occupies when the check-rein is hooked up; and its working position is also indicated by dotted lines. Fig. 2 illustrates the manner of attaching the inner end of this check-strap to one of the driving-reins; the reins being indicated by dotted lines. Fig. 3 is a side-view of the hook with the checking-strap in position. Figs. 4, 5 and 6 are top-views of the hook and the checking-strap illustrating the different positions into which the strap is brought in the two operations of checking and unchecking. Fig. 4 shows the position of the parts before the check-rein is hooked up; Fig. 5, the position when hooked, and Fig. 6 the position when the check-rein is unhooked. Fig. 7 is a top-view of the inner end-portion of the checking-strap, or that end which is carried by the driving-rein. Fig. 8 is a side-view of the same portion of the checking-strap, and the driving-rein to which it is attached. Fig. 9 is a view of the slide that connects the checking-strap to the driving-rein.

A indicates the check-hook.

$b\ b$ are counter-sunk holes for screws or rivets to secure the hook on the harness pad or saddle; and $c\ d$ are loops or staples on the hook that confine the checking-strap in working position and also serve to guide it in its movements.

F is a catch on the checking-strap E formed of a projecting pin or stud strongly fixed to the strap and suitably shaped to engage with and work in the check-hook.

G is a loop or slide embracing, and fitted to slide easily on, the drive-rein W to carry the end of the checking-strap.

$E^\times$ is a finger-loop on the end of the checking-strap.

The principal parts or members of my improved hook consist of the diverging horns 1—2— extending forward and formed with perpendicular guiding edges that serve to guide the locking-pin or catch on the strap E into the throat of the check-hook; the backwardly turned hook 3—4 terminating in a barb, or point; the curved guard 5—6 partly surrounding or embracing the point of the main-check hook; and two guiding faces or edges 7—8 one extending backwardly from the throat of the main-hook until it meets the other guiding edge and the latter edge extending to the front on the outside or to one side of the main hook.

The curved horn, or member, terminating in the point 4 forms the main-hook that engages the projecting catch F on the checking-strap, while the parts 5—6— are formed and arranged to act both as a guide for the catch F and as a stop to control the length of pull necessary to hook the checking-strap. The guiding-edge or face 7 is set within the throat of the main hook, and slightly diagonal across the longitudinal center line $x\ x$ of the hook (see Fig. 5); so that the catch or pin F on the checking-strap shall not fail to strike the guide when the strap is pulled back by the finger-loop on the end. The outer guide 8 springs from the rear end of the guiding-face 7 and extends to the front a sufficient distance to pass the main hook.

The loop —$c$— at the rear end of the attachment has about the same width as the checking-strap, but the one —$d$— at the front extends across the main hook and has sufficient width of opening between its perpendicular side-bars, or ends, to allow the strap to move laterally over the hook to one side or the other in the operations of hooking and unhooking; but at the same time the side-bars prevent the strap from being thrown too far to one side or the other by the movements of the horse and keep the catch F of the strap always in position within the space between the horns 1—2; so that the catch F will always be drawn into the hook when the strap is pulled back by the driver in the operation of checking-up.

In some cases I set an outer guide —9— alongside and parallel with the divergent guide —8; in which case the two edges 8—9— are united by a web across the bottom, and the space between the two edges or faces forms a channel of suitable width for the catch F to slide in. The single guiding-face 8 will be found to work well however without the outer guide. The latter construction is represented in Figs. 1, 4 and 5; and the construction in which the outer guide is omitted is shown in Fig. 6. This hook or part A of the device is of such construction that it can readily be cast in one piece.

The strap E is attached to or forms an extension of the check-rein, and the catch is strongly fastened to the strap in any suitable manner. In the present construction—as shown in the drawings—this catch is a stud or pin projecting from a plate —$f$— which is riveted to the strap, and the end of the pin is finished with an enlarged or broadened head that will set beyond and extend or lap over the edges of the faces of the hook against which the body of the pin sets and slides when in working position.

The checking-strap should be of suitable length to run back from the point F to the vehicle to a position about over the dash-board, or within convenient reach of the driver. The usual manner of arranging this strap in devices of this class is to carry it on one of the drive-reins by means of several loops fixed on the rein at intervals apart, with the end of the strap loosely hanging at the last loop a sufficient length to prevent the strap from being drawn out of the loop when the horse is unchecked and the strap is drawn forward by the strain or pull on the check-rein. As an improvement on this mode of arranging the strap in position to be reached and worked by the driver I attach the strap to one end of the reins by a sliding loop or band G to which this strap is fastened; so that the strap itself is always attached to the rein and yet is capable of sliding or moving on the rein, and the rein can be slackened or tightened without affecting the strap. In connection with this means of attaching the strap to the rein, a finger-loop $E^\times$ is formed by bending back the end-portion of the strap and fastening it to the same slide. For this purpose a stud or projection $G^\times$ with a T-shaped head is fixed on the bottom side of the slide, and two slits or holes $h\ h^\times$ are formed in the strap one near the end and another at some distance in front of it; so that by first setting the stud through the leading hole $h$ and then bringing the hole $h^\times$ near the end of the strap upon the same stud the bend in the strap will form a finger-loop that will lie up against the drive-rein out of the way and at the same time will be in position for use at all times. Thus the end of the checking-strap is attached to the drive-rein under all conditions when in use, and cannot be disconnected by any movements of the horse or in the handling of the drive-reins.

By sliding the loop G along the rein any amount of loose play can be given to the check-rein when the horse is unchecked; and, on the other hand, the slack can be taken up by moving the slide G back. This arrangement is superior in many respects to other modes used in devices of this kind, especially in appearance, and in the effective working of the attachment.

Referring to Figs. 1, 4, 5 and 6 of the drawings in which the operation of the hook and the strap is well represented, it will be seen that when the horse is checked up the catch F rests in the hook 3—4— as seen in Fig. 1. The catch is drawn into the hook from the position outside—as shown in Fig. 4—by pulling back on the checking-strap until the catch is brought against the curved back face of the guard 5 which forms a stop for the catch at the same time; and, as soon as the pull or strain on the loop at the end of the checking strap is taken off and the strap is relaxed, the catch F will be thrown forward over the point —6— into the hook —3—4.

To uncheck the horse, the driver pulls back on the strap E until the catch F passes from the guiding edge or face 7 around the point 10 to the opposite side; and from that position when the strap is relaxed the catch will slide easily forward along the guide 8 leaving the horse free to move his head. Fig. 6 illustrates the position of the catch at such time.

Having thus fully described my invention, what I claim as new, and desire to secure by Letters Patent, is—

1. A checking and unchecking device comprising a checking-hook —3—4— with divergent guides —1—2—, the guard —6— to prevent unhooking of the checking-strap or rein, the unchecking guides —7—8— and the loops —c—d— adapted for operation with a checking-strap or rein having a catch to engage the hooks and guides of said device, substantially as hereinbefore described.

2. The combination with a check-strap or rein having a catch or projection to engage and lock into a hook, of a checking-hook —3—4— the diverging guides —1—2— the guard —6— adapted to prevent the catch from unhooking the unchecking guides—7—8—the narrow loop —c— behind the checking-hook and the broad loop —d— over the checking-hook having end bars that act to limit the lateral movement of the checking-strap or rein and confine the catch on the hook, substantially as described.

3. The herein described checking and unchecking hook formed in one piece, and composed of the main hook —4— terminating in a backwardly turned barb —3, the curved guard —5—6— partly surrounding the point of the main-hook, the diverging checking guides —1—2— arranged to guide a catch on the check-rein into the hook, the unchecking guide —7— within the throat of the main hook, the outer guide —8— springing from the barb end of the guide —7— and extending to the front beyond the main-hook, the narrow loop —c— at the rear end and the wide loop —d— over the main hook constructed for operation as set forth.

In testimony that I claim the foregoing I have hereunto set my hand and seal.

JAMES ARNOTT, JR. [L. S.]

Witnesses:
EDWARD E. OSBORN,
CHAS. E. KELLY.